(12) United States Patent
Fujishiro et al.

(10) Patent No.: US 12,305,685 B2
(45) Date of Patent: May 20, 2025

(54) FASTENING STRUCTURE AND KEYBOARD DEVICE

(71) Applicant: Yamaha Corporation, Hamamatsu (JP)

(72) Inventors: Kaoru Fujishiro, Hamamatsu (JP); Ichiro Osuga, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 176 days.

(21) Appl. No.: 18/207,207

(22) Filed: Jun. 8, 2023

(65) Prior Publication Data

US 2023/0323911 A1    Oct. 12, 2023

Related U.S. Application Data

(60) Division of application No. 16/576,352, filed on Sep. 19, 2019, now Pat. No. 11,767,873, which is a (Continued)

(30) Foreign Application Priority Data

Mar. 23, 2017 (JP) .................................. 2017-058077

(51) Int. Cl.
*G10C 3/12* (2006.01)
*F16B 25/00* (2006.01)
(Continued)

(52) U.S. Cl.
CPC ............ *F16B 25/0036* (2013.01); *G10C 3/12* (2013.01); *G10C 3/16* (2013.01); *F16B 5/00* (2013.01)

(58) Field of Classification Search
CPC ...... G10C 3/12; G10C 3/16; F16B 5/02; F16B 25/0015; F16B 25/0031; F16B 25/0036
See application file for complete search history.

(56) References Cited

U.S. PATENT DOCUMENTS 590,521 A * 9/1897 Hay .................... G10C 3/12
84/440
925,057 A * 6/1909 Vogel .................. G10C 3/16
84/243
(Continued)

FOREIGN PATENT DOCUMENTS

JP   2002-89525 A    3/2002
JP   2002-266824 A   9/2002

OTHER PUBLICATIONS

International Search Report (PCT/ISA/210) issued in PCT Application No. PCT/JP2018/011404 dated May 29, 2018 with English translation (four (4) pages).
(Continued)

*Primary Examiner* — Flemming Saether
(74) *Attorney, Agent, or Firm* — Crowell & Moring LLP

(57) ABSTRACT

A fastening structure for fastening a to-be-fastened component to a wooden component by using a screw, wherein the wooden component is made of wood having a specific gravity of 0.08 g/cm³ to 0.85 g/cm³ inclusive, the screw has a nominal diameter of 0.8 mm to 3.5 mm inclusive, and the distance between a neutral position in a longitudinal direction of an effective screw part, which is the portion where the wooden component and a male screw part formed in a shaft part of the screw mesh together, and the surface of the wooden component that comes into contact with the to-be-fastened component is 1 mm to 15 mm inclusive.

6 Claims, 5 Drawing Sheets

Related U.S. Application Data continuation of application No. PCT/JP2018/011404, filed on Mar. 22, 2018.

(51) Int. Cl.
*G10C 3/16* (2019.01)
*F16B 5/00* (2006.01)

(56) References Cited

U.S. PATENT DOCUMENTS

| | | | |
|---|---|---|---|
| 1,342,029 A * | 6/1920 | Ong | G10C 3/18 |
| | | | 84/240 |
| 2,377,397 A | 6/1945 | Booth | |
| 3,120,146 A * | 2/1964 | Stiles | G10C 3/12 |
| | | | 84/433 |
| 3,207,023 A | 9/1965 | Knohl | |
| 3,967,083 A | 6/1976 | Bould et al. | |
| 4,338,847 A | 7/1982 | Brennan | |
| 4,343,126 A | 8/1982 | Hoofe, III | |
| 4,383,464 A | 5/1983 | Brennan | |
| 4,543,763 A | 10/1985 | Ernst et al. | |
| 5,061,135 A | 10/1991 | Pritchard | |
| 5,540,531 A | 7/1996 | Choiniere | |
| 6,874,290 B1 | 4/2005 | Bokan | |
| 6,907,699 B2 | 6/2005 | Schmid | |
| 8,939,693 B2 | 1/2015 | Taneichi | |
| 10,746,211 B2 | 8/2020 | Foser | |
| 10,984,761 B2 * | 4/2021 | Ogawa | G10H 1/344 |
| 2007/0166126 A1 * | 7/2007 | Harney | F16B 25/0031 |
| | | | 411/402 |
| 2008/0005994 A1 | 1/2008 | Harney | |
| 2014/0366707 A1 * | 12/2014 | Liu | G10C 3/12 |
| | | | 84/435 |
| 2021/0372454 A1 | 12/2021 | Pfister | |

OTHER PUBLICATIONS

Extended European Search Report issued in European Application No. 18772157.6 dated Dec. 18, 2020 (seven (7) pages).
European Office Action issued in European Application No. 18772157.6 dated Jan. 2, 2023 (five (5) pages).

* cited by examiner

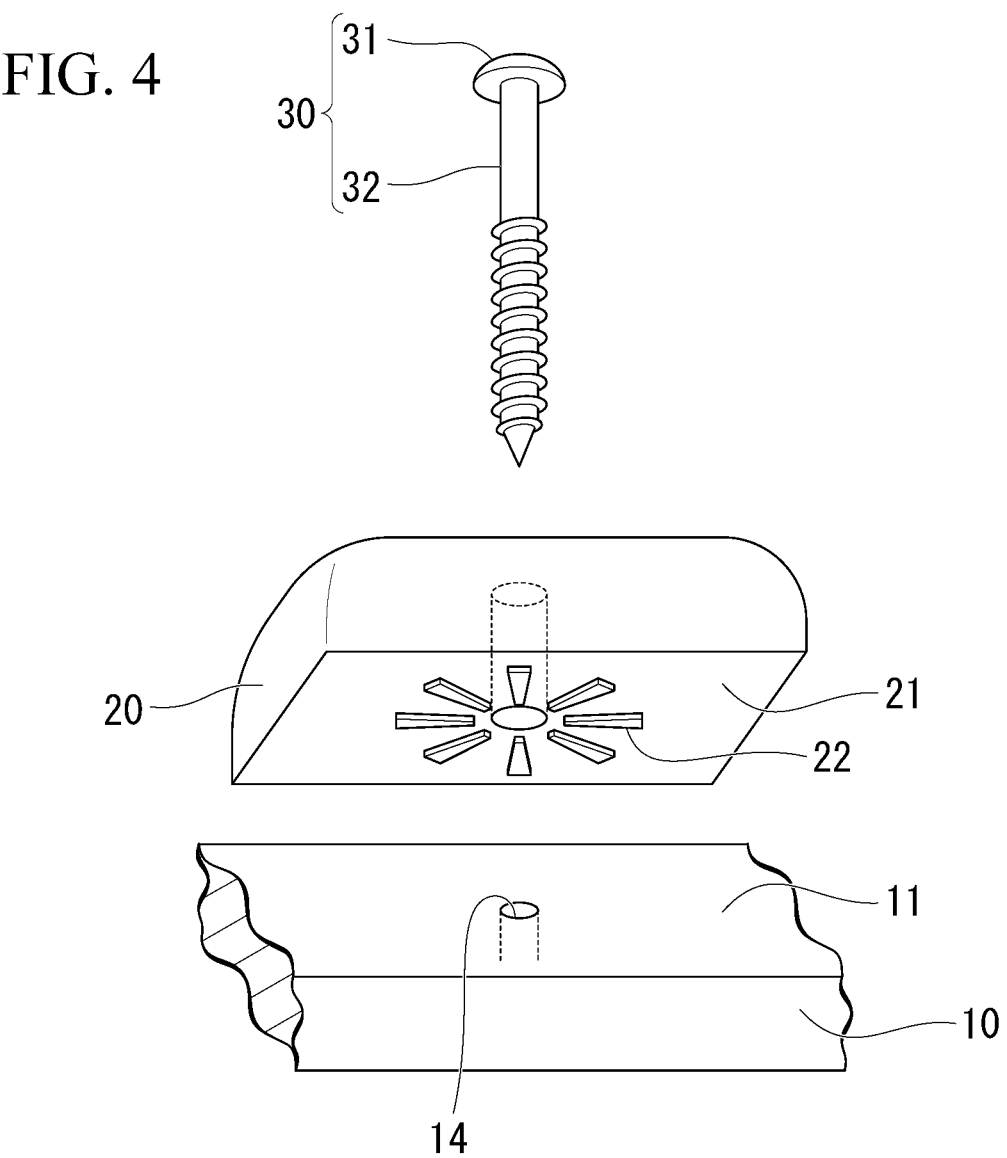

FASTENING STRUCTURE AND KEYBOARD DEVICE

PRIORITY CLAIM

This application is a divisional application of U.S. application Ser. No. 16/576,352, filed Sep. 19, 2019, which is a continuation application of a PCT Application No. PCT/JP2018/011404, filed Mar. 22, 2018, entitled "FASTENING STRUCTURE AND KEYBOARD DEVICE" whose priority is claimed on Japanese Patent Application No. 2017-058077, filed Mar. 23, 2017. The description thereof is incorporated herein by reference.

BACKGROUND OF THE INVENTION

Field of the Invention

The present invention relates to a fastening structure and a keyboard device.

Description of Related Art

Conventionally, it is a well-known structure that fastens a to-be-fastened component to a wood component by fastening a screw penetrating the to-be-fastened component to the wood component.

Japanese Unexamined Patent Application, first Publication No. 2002-266824 (JP-A 2002-266824) discloses a structure in which two wood components are fixed using a nail having a screw function that bites into wood by being turned with a driver, in addition to a function that bites into wood by being hammered.

Wood components expand by moisture absorption and contract by drying. For this reason, when a wood component to which a to-be-fastened component has been fastened by a screw absorbs moisture, the wood component expands, and a force acts on the screw in a direction of being pulled out from the wood component. As a result, there is a risk of the wood component being plastically deformed and undergoing wear at the portion engaged with the male screw portion of the screw.

When the wood component in which a portion meshed with the male screw portion has undergone plastic deformation dries, a gap is generated between the to-be-fastened component and the wood component. This gap leads to a risk of the fastening condition between the to-be-fastened component and the wood component loosening. When the fastening structure is included in various musical instruments (for example, an acoustic piano), the loosening of the fastening structure adversely affects the performance of the musical instrument, and so is not particularly preferable.

SUMMARY OF THE INVENTION

The present invention has been made in view of the above-mentioned circumstances. The present invention therefore has as its object to provide a fastening structure and a keyboard device capable of suppressing loosening of a fastened state between a to-be-fastened component and a wood component even if the wood component expands or contracts.

In order to solve the aforementioned issue, the present invention provides the following means.

A fastening structure for fastening a to-be-fastened component to a wood component by using a screw, in which the wood component is made of wood having a specific gravity of 0.85 g/cm$^3$ or less, the screw has a nominal diameter of 3.5 mm or less, and the distance between an intermediate position in a longitudinal direction of an effective screw portion, which is the portion where the wood component and a male screw portion formed on a shaft portion of the screw mesh together, and a contact surface of the wood component with the to-be-fastened component is 8 mm or less.

BRIEF DESCRIPTION OF THE DRAWINGS

FIG. 4 is an exploded perspective view showing a modification of the fastening structure of the second embodiment.

EMBODIMENTS FOR CARRYING OUT THE INVENTION

Hereinafter, the present invention will be described on the basis of preferred embodiments.

Figure 1:
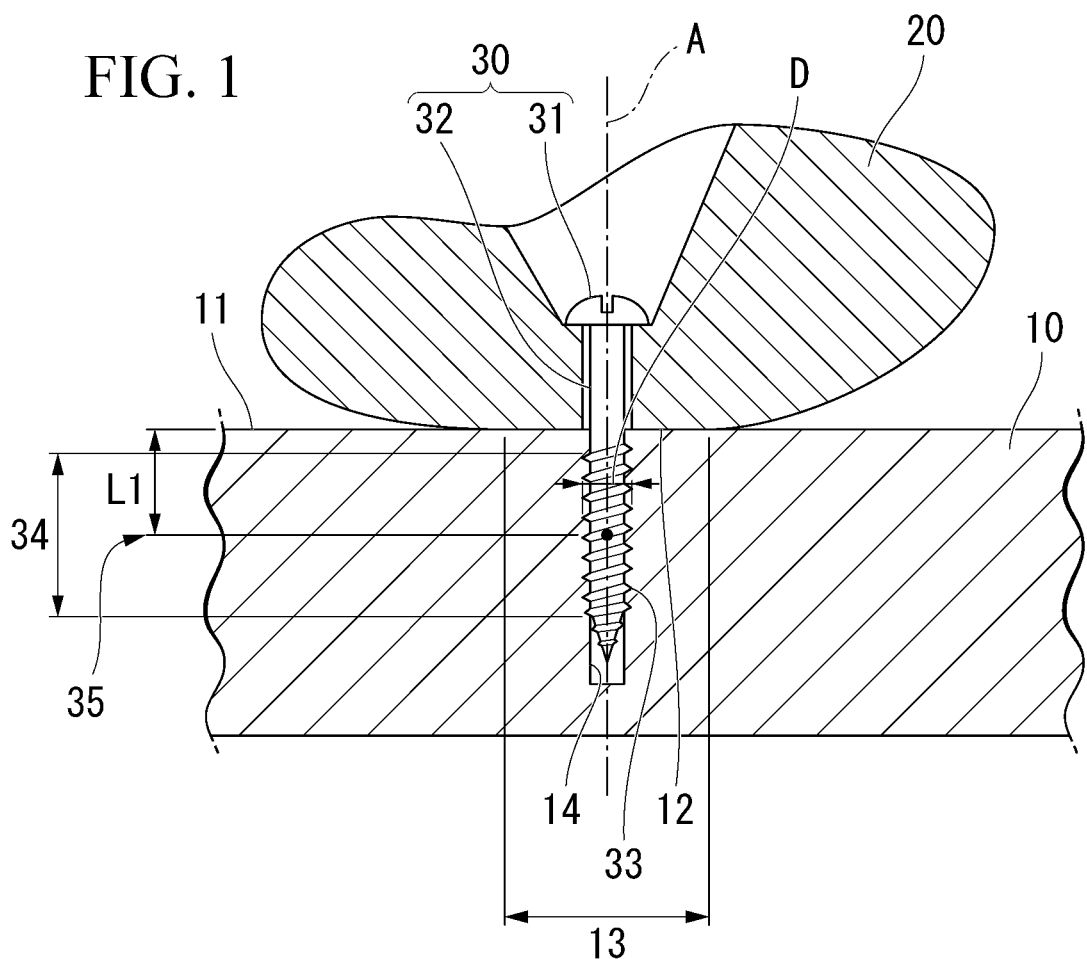
FIG. 1 is a cross-sectional view showing an example of the fastening structure of the first embodiment.

FIG. 1 schematically shows an example of a fastening structure of the first embodiment.

The fastening structure of the present embodiment is provided with a wood component 10, a to-be-fastened component 20, and a screw 30. A shaft portion 32 of the screw 30 is passed through the to-be-fastened component 20 to be fastened to the wood component 10, whereby the to-be-fastened component 20 is fastened to the wood component 10.

In the present embodiment, the length of the screw 30 is 30 mm or less. The thickness of the wood component 10 is about 30 mm.

The wood constituting the wood component 10 preferably has a specific gravity of 0.08 g/cm$^3$ to 0.85 g/cm$^3$. Balsa wood, for example, corresponds to a wood having a specific gravity of 0.08 g/cm$^3$. Indian rosewood, for example, corresponds to a wood having a specific gravity of 0.85 g/cm$^3$.

It is easy to obtain long members suitable for musical instrument parts, such as wood keys, from soft materials such as softwoods, which have a low specific gravity. Examples of the specific gravity of the wood component 10 are about 0.85 g/cm$^3$, about 0.7 g/cm$^3$, about 0.6 g/cm$^3$, about 0.5 g/cm$^3$, about 0.4 g/cm$^3$, about 0.3 g/cm$^3$ and the like.

While not being specifically limited, the to-be-fastened component 20 can be constituted from a resin, a metal, a base material, and the like. The screw 30 has a head portion 31 and a shaft portion 32. The head portion 31 is provided at one end of the shaft portion 32. Examples of the head portion 31 of the screw 30 include, but are not limited to, a pan head, a countersunk head, a round countersunk head, a cheese head, a truss head, a bind head, a low head, and the like. The head portion 31 is provided with a drive recess for turning the screw 30 with a tool such as a driver. Examples of the drive recess include a slot (groove), cross slot, a hexagonal hole, a square hole and the like.

The head portion 31 has a seat surface at the boundary with the shaft portion 32 as a portion which receives a direct force when the screw 30 is tightened. The shape of the seat surface includes a flat surface, a conical surface and the like. If the seat is non-planar, the entire seat is included in the head portion 31.

A male screw portion 33 is formed on the shaft portion 32. The male screw portion 33 may be formed up to the vicinity of the seat surface of the head portion 31. Examples of the shape of the male screw portion 33 include a triangular screw, a square screw, a trapezoidal screw, and a light bulb screw. The shaft portion 32 between the head portion 31 and the male screw portion 33 may be provided with a cylindrical portion having no screw thread and no screw groove.

Examples of a screw for being fastened to the wood component 10 include a wood screw, a tapping screw, and the like. As the screw 30, a screw having a nominal diameter D of 0.8 mm to 3.5 mm inclusive is used. Examples of the nominal diameter of the screw 30 include about 1.6 mm, about 1.8 mm, about 2.1 mm, about 2.4 mm, about 2.7 mm, about 3.1 mm, and about 3.5 mm.

A portion around the shaft portion 32 in the to-be-fastened component 20 is sandwiched between a surface 11 of the wood component 10 and the head portion 31 of the screw 30. A contact surface 12 is a portion of a surface 11 of the wood component 10 that is in contact with the to-be-fastened component 20 side. An axial vicinity portion 13 is a range extending in parallel with an axis A of the screw 30 from the contact surface 12. An effective screw portion 34 is a portion at which the male screw portion 33 and the wood component 10 mesh with each other.

A spacer may be interposed between the wood component 10 and the to-be-fastened component 20 for the purpose of fine adjustment of height and angle, as will be described in detail later. In this case, the two or more types of the to-be-fastened component 20 and the spacer can be referred to as to-be-fastened components to be fastened to the wood component 10.

In the fastening structure of the present embodiment, a distance L1 between an intermediate position 35 in the longitudinal direction of the effective screw portion 34 and the contact surface 12 of the wood component 10 with the to-be-fastened component 20 is 1 mm and more and 15 mm or less, and more preferably 8 mm or less. When the distance L1 is less than 1 mm, practical strength of the screw 30 no longer arises. Moreover, 15 mm, which is the upper limit of the distance L1, is about ½ of the thickness 30 mm of the wood component 10, and it is considered that the fastening strength of the screw 30 does not change even if the distance L1 is longer than 15 mm. By setting the distance L1 as described above, even if expansion or contraction of the wood component 10 occurs due to a change in temperature or humidity, since the distance L1 between the effective screw portion 34 and the contact surface 12 is short, the amount of displacement of the to-be-fastened component 20 that abuts the wood component 10 is small.

When the wood component 10 has expanded at the time of moisture absorption or the like, the to-be-fastened component 20 may be displaced in a direction in which the screw 30 is pulled out by the head portion 31 along the lengthwise direction of the screw 30. When the displacement amount of the to-be-fastened component 20 is large, the force in the direction of pulling out the screw 30 acts more strongly. As a result, plastic permanent deformation occurs in the meshing between the male screw portion 33 and the wood component 10, leading to the risk of deterioration or damage to the fastening structure and loosening of the fastened state.

It is also conceivable to provide a spring washer on the screw 30 to absorb the displacement of the to-be-fastened component 20. However, adding another part leads to the risk of handling becoming difficult during fastening work, a rise in cost, and a deterioration in appearance.

When the displacement amount of the to-be-fastened component 20 is small, the structure of the wood component 10 meshing with the male screw portion 33 undergoes viscoelastic deformation, and a fastening structure capable of reversibly absorbing the displacement is configured.

During expansion of the wood component 10, a target range for exerting an effect on the displacement of the to-be-fastened component 20 is estimated to be approximately the range of the distance from the contact surface 12 to the effective screw portion 34. The average position of the meshing position with the male screw portion 33 is an intermediate position 35 of the effective screw portion 34. The distance L1 between this intermediate position 35 and the contact surface 12 indicates the size of the target range in which the head portion 31 of the screw 30 is displaced via the to-be-fastened component 20 when the wood component 10 is expanded. That is, the magnitude of the distance L1 is reflected in the magnitude of the displacement amount of the to-be-fastened component 20 with respect to the intermediate position 35 at the time of expansion of the wood component 10.

For this reason, in order to reduce the displacement amount of the to-be-fastened component 20, a reference can be set by defining an upper limit to the distance L1 between the intermediate position 35 and the contact surface 12. That is, if the target range affecting the displacement of the to-be-fastened component 20 is shortened when the wood component 10 is expanded, the amount by which the screw 30 is pulled out in the vicinity of the effective screw portion 34 is reduced. As a result, the amount by which the screw 30 is pulled out tends to fall within the range in which the wood structure is reversibly deformed.

The upper limit value of the distance L1 can also be experimentally found, for example, for a fastening structure to a soft material such as a softwood. When the distance L1 is 8 mm or less, loosening of the state of the fastening structure is effectively prevented. Examples of the distance L1 include, but are not particularly limited to, about 8 mm, about 7 mm, about 6 mm, about 5 mm, about 4 mm, about 3 mm, and the like.

In general, using a short screw having a small nominal diameter for a soft material such as a softwood causes an absolute lack of strength and lacks reliability because a fastening condition is not determined, and so has been avoided. A state in which the fastened screw is suitably loosened may, depending on the application, contribute to the flexibility of the structure, and using multiple screws to provide redundancy can extend the scope of application. However, when fastening parts used in a musical instrument with a screw, particularly when the fastened parts have a function to control the sound or operation of the instrument, slight noises or operational rattling due to loosening of the screw can be a problem.

In the example shown in FIG. 1, the wood component 10 is provided with a pilot hole 14 in order to facilitate fastening of the screw 30 to the wood component 10. The inner diameter of the pilot hole 14 is narrower than the shaft portion 32 of the screw 30 in order to facilitate meshing of the male screw portion 33 with the inner surface of the pilot hole 14.

Figure 2:
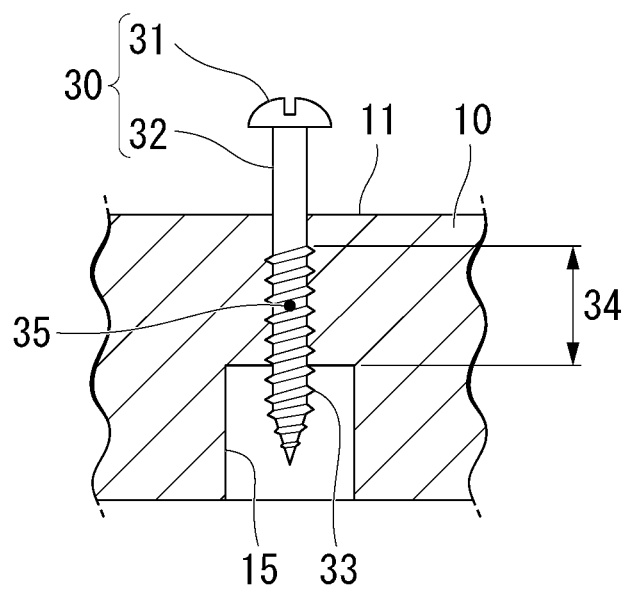
FIG. 2 is a cross-sectional view showing a modified example of the fastening structure of the first embodiment.

FIG. 2 schematically shows a modified example of the fastening structure of the first embodiment. Note that illustration of the to-be-fastened component 20 is omitted in FIG. 2. In the example shown in FIG. 2, the screw 30 meshes with the wood component 10 without providing a pilot hole in the wood component 10. Moreover, in the example shown in FIG. 2, a recess 15 is formed on the opposite side to the contact surface 12 of the wood component 10. As shown in the drawing, the male screw portion 33 is not meshed with the wood component 10 in the recess 15. For that reason, the range in which the male screw portion 33 is exposed in the recess 15 is excluded from the effective screw portion 34.

Figure 3A:
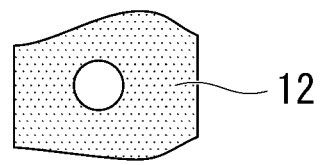
FIG. 3A is a cross-sectional view showing the contact surface in the fastening structure of the second embodiment.
Figure 3B:
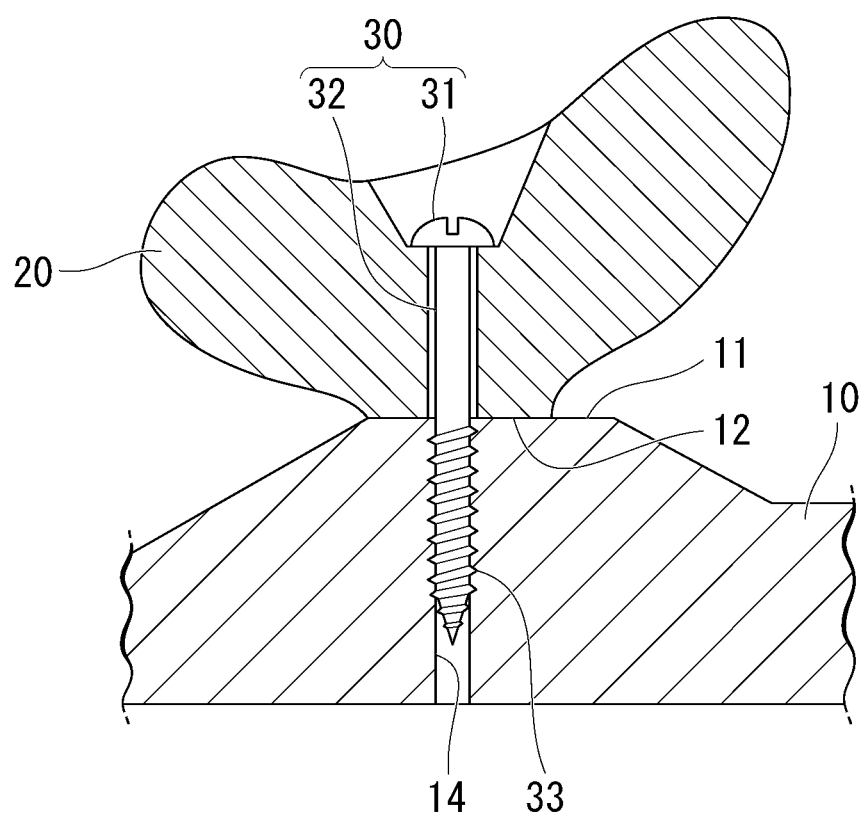
FIG. 3B is a cross-sectional view along the lengthwise direction of the screw, in the fastening structure of the second embodiment.

FIGS. 3A and 3B schematically show an example of the fastening structure of a second embodiment. FIG. 3A is a transverse cross-sectional view of the contact surface 12, and FIG. 3B is a longitudinal cross-sectional view along the lengthwise direction of the screw 30. In the fastening structure of the present embodiment, the area of the contact surface 12 is 100 mm$^2$ or less per screw. Similarly to the first embodiment, the specific gravity of the wood component 10 is preferably 0.85 g/cm$^3$ or less, and the nominal diameter of the screw 30 is preferably 0.8 mm or more and 3.5 mm or less. Further, as in FIG. 1, it is preferable that the distance L1 between the intermediate position 35 of the effective screw portion 34 and the contact surface 12 of the wood component 10 be 1 mm or more and 15 mm or less, and more preferably 8 mm or less.

Accompanying the fastening of the screw 30, an acting/reacting load between the wood component 10 and the to-be-fastened component 20 is concentrated on the contact surface 12. Therefore, in the present embodiment, by providing an upper limit to the area of the contact surface 12, a layer on the surface 11 side near the contact surface 12 of the wood component 10 can be compressively deformed in a reversible manner. By combining the condition of setting the upper limit to the distance L1 and the condition of setting the upper limit to the area of the contact surface 12 per screw, together with the effect that the wood structure meshing with the effective screw portion 34 is reversibly deformed, it is possible to extend the effect of preventing loosening of the screw 30.

The upper limit of the area of the contact surface 12 per screw can also be determined experimentally for a fastening structure to, for example, a soft material such as softwood. When the area of the contact surface 12 per screw is 100 mm$^2$ or less, loosening of the fastening structure is effectively prevented. Examples of the area of the contact surface 12 per screw include, but are not particularly limited to, about 100 mm$^2$, about 90 mm$^2$, about 80 mm$^2$, about 70 mm$^2$, about 60 mm$^2$, about 50 mm$^2$, about 40 mm$^2$, and about 30 mm$^2$.

In order to narrow the area of the contact surface 12 per screw, one or more projections may be provided on at least one of the surface 11 of the wood component 10 and a back surface 21 of the to-be-fastened component 20. FIG. 4 schematically shows a modification of the fastening structure of the second embodiment. In the example shown in FIG. 4, a plurality of projections 22 are formed on the back surface 21, which is the side of the to-be-fastened component 20 facing the wood component 10.

The total area over which the plurality of projections 22 corresponding to one screw 30 abut the wood component 10 is the area of the contact surface 12 per screw. The shape of the projections 22 is not particularly limited, and may be, for example, a crest shape, a dot shape, a boss shape, a rib shape and the like. When the projections 22 are provided on at least one surface of the wood component 10 and the to-be-fastened component 20 that are facing each other, the distal end face of each projection 22 abuts with the component facing the projection 22.

Figure 5:
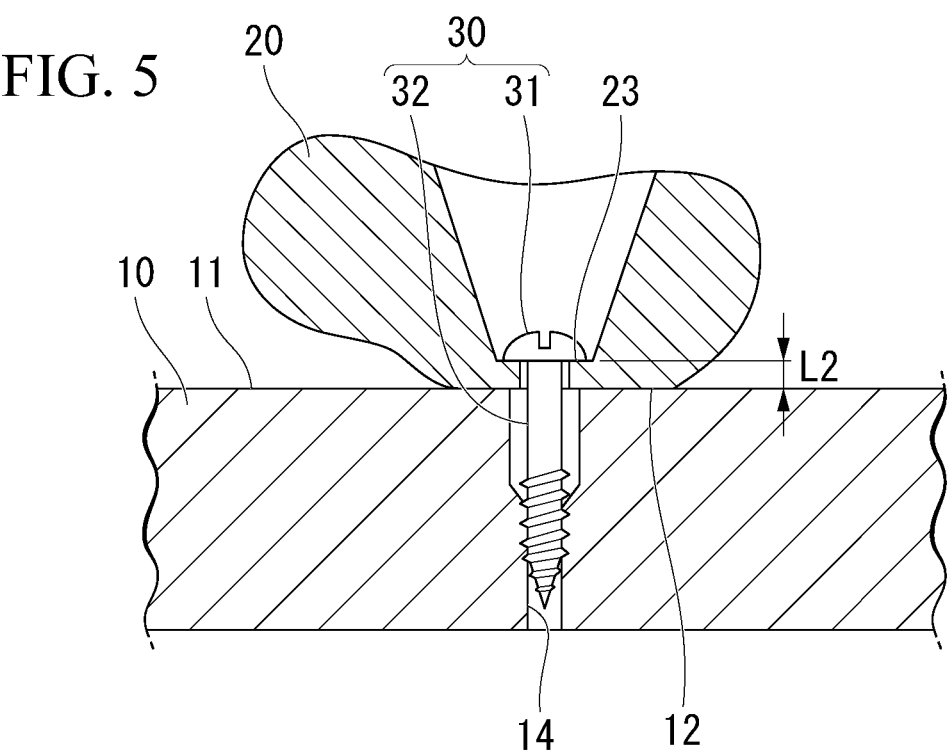
FIG. 5 is a cross-sectional view showing an example of the fastening structure of the third embodiment.

FIG. 5 schematically shows an example of the fastening structure of a third embodiment. In the present embodiment, a distance L2 between a to-be-pressed surface 23 of the to-be-fastened component 20 and the contact surface 12 of the wood component 10 with the to-be-fastened component 20 is 2 mm or less. Here, the to-be-pressed surface 23 is a portion where the to-be-fastened component 20 is pressed from the head portion 31 of the screw 30.

As in the first embodiment, it is preferable that the specific gravity of the wood component 10 of this embodiment be 0.85 g/cm$^3$ or less, and the nominal diameter of the screw 30 be 0.8 mm to 3.5 mm. Further, as in FIG. 1, it is preferable that the distance L1 between the intermediate position 35 of the effective screw portion 34 and the contact surface 12 of the wood component 10 be 1 mm or more and 15 mm or less, and more preferably 8 mm or less. Similarly to the second embodiment, the area of the contact surface 12 may be 100 mm$^2$ or less per screw.

When the to-be-fastened component 20 includes wood, the wood contained in the to-be-fastened component 20 expands due to moisture absorption and shrinks due to drying. In addition, when the to-be-fastened component 20 is a non-wood material such as metal or resin, expansion or contraction due to temperature is larger than that of wood, with the to-be-fastened component 20 expanding at a high temperature and contracting at a low temperature.

When the to-be-fastened component 20 expands, the head portion 31 of the screw 30 may be displaced in the direction in which the screw 30 is pulled out at the head portion 31 along the longitudinal direction of the screw 30. If the displacement of the head portion 31 is large, the force in the direction of pulling out the screw 30 acts more strongly, whereby plastic permanent deformation may occur in the meshing between the male screw portion 33 and the wood component 10, leading to deterioration or damage in the fastening structure and loosening of the fastened state.

Therefore, in this embodiment, by providing an upper limit to the distance L2 between the to-be-pressed surface 23 and the contact surface 12, it is possible to reduce the absolute amount of expansion or contraction of the to-be-fastened component 20, and inhibit loosening of the screw 30 caused by expansion or contraction of the to-be-fastened component 20. Examples of the distance L2 include, but are not limited to, about 2 mm, about 1.5 mm, about 1 mm, about 0.5 mm, and the like.

When the seat surface of the head portion 31 of the screw 30 is non-planar, the position of the to-be-pressed surface 23 may be a position closest to the contact surface 12 among the portions where the head portion 31 contacts the to-be-fastened component 20. When a washer (not shown) is interposed between the head portion 31 of the screw 30 and the to-be-pressed surface 23 of the to-be-fastened component 20, the thickness of the washer may be excluded from the distance L2.

By combining the condition of setting the upper limit to the distance L1 and the condition of setting the upper limit to the distance L2, together with the effect that the wood structure meshing with the effective screw portion 34 is reversibly deformed, it is possible to extend the effect of preventing loosening of the screw 30.

When the to-be-fastened component 20 is made of wood having a specific gravity of 0.85 g/cm$^3$ or less, as in the case of the wood component 10, an upper limit may be provided for the total of the distance L1 and the distance L2, that is, the distance between the intermediate position 35 of the effective screw portion 34 and the to-be-pressed surface 23 of the to-be-fastened component 20. Letting the total of the distance L1 and the distance L2 be L3, the distance L3 is preferably 10 mm or less.

Examples of the distance L3 include, but are not particularly limited to, about 10 mm, 9 mm, 8 mm, 7 mm, 6 mm, 5 mm, 4 mm, 3 mm, and the like.

Figure 6:
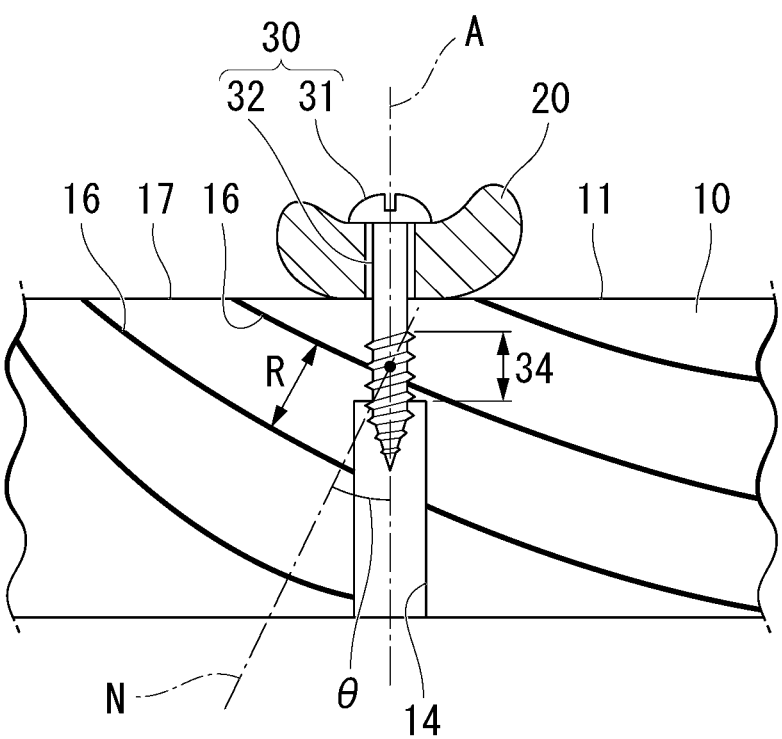
FIG. 6 is a cross-sectional view showing an example of the fastening structure of the fourth embodiment.

FIG. 6 schematically shows an example of the fastening structure of the fourth embodiment. In the above-described fastening structure, the effective thread 34 may be entangled with a dark ring 16 of the wood component 10. Wood grown in a temperate zone to a cool zone usually has dark rings 16 and light rings 17 alternately formed due to the difference in the growth rate of the cell wall depending on the season, resulting in annual rings. The dark rings 16 have a higher strength than the light rings 17, and variations due to characteristic differences between the dark rings 16 and the light rings 17 are large. Therefore, when the male screw portion 33 meshes with a portion including the dark ring 16, it is possible to enhance the viscoelastic reversible deformation characteristics.

For example, a value (R/cos θ) obtained by dividing the average annual ring interval R by the cosine of the angle θ formed by the axis A of the screw 30 and the normal N of the annual ring surface in the vicinity of the effective screw portion 34 is the average distance of dark rings 16 along the axis A. Therefore, by setting the length of the effective screw portion 34 to be larger than R/cos θ, it is possible to more reliably configure a fastening structure in which the effective screw portion 34 is entangled with dark rings 16.

Fastening with the screw 30 has excellent workability, with less management items than adhesion and the like. Further, since the screw 30 is removable, when a spacer is interposed between the wood component 10 and the to-be-fastened component 20, the height and angle can be adjusted by trial. When the to-be-fastened component is fixed by adhesion or the like, subsequent removal and reattachment is difficult even if one tries to make fine adjustments to the height or angle of the to-be-fastened component. For this reason, for example, when fixing a functional component to a wood component such as a wood key in a keyboard instrument, quality stability and improvement of workability can be achieved by fastening the functional component to the wood component with a screw. By making the functional component detachable from the wood component, replacement with spacers having different heights and angles becomes possible.

Examples of functional components for musical instruments include operating force transfer members (a switch drive (SW) actuator, hammer drive actuator, after sensor pusher, and the like), operation detection means (a sensor, reflector, gray scale, shutter plate, and the like), key guide mechanisms, key movement control mechanisms (rest, key dip block, L foot and the like), shock absorbing materials (felt, rubber, foam material and the like), mass bodies (counterweight and the like), and protective plates (grease cover and the like). The musical instrument is not particularly limited, and examples thereof include a keyboard instrument such as a piano, a string instrument such as a harp, a percussion instrument, and a wind instrument.

Figure 7:
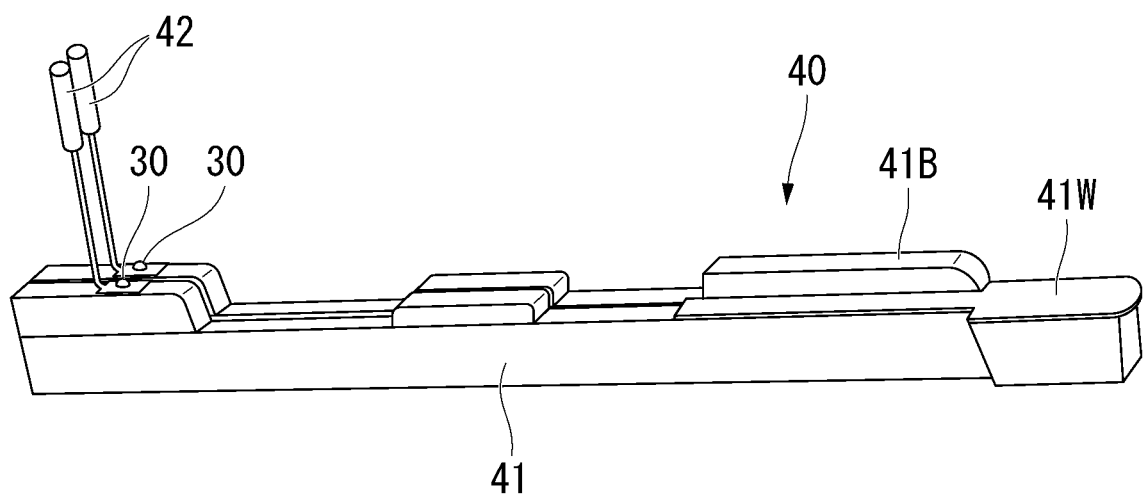
FIG. 7 is a perspective view showing the main parts of a keyboard device.

FIG. 7 schematically shows the main parts of the keyboard device in a keyboard instrument. FIG. 7 shows one white key 41W and one black key 41B of a keyboard device 40. The wood key 41 is a long part, and therefore, it is advantageous to construct the wood key 41 from conifer, in which it is easy to obtain a member having high straightness of grain and having no excluded parts such as a knot over a certain distance. A backcheck component 42 is fixed near one end of the wood key 41. The backcheck component is a mechanical part that receives the hammer, which is included in the action mechanism (not shown) of the keyboard instrument. When the wood key 41 is depressed, the hammer strikes the string in conjunction with the movement of the key, and then rebounds and returns.

The backcheck component receives and brakes the motion of the returning hammer.

For example, when fixing the backcheck component 42 to the wood key 41, the fastening structure of each of the above-described embodiments can be adopted as a fastening structure by using the screw 30. In this case, components to be fastened to the wood key 41 include the backcheck component 42 and a spacer. When a spacer is interposed between the wood key 41 and the backcheck component 42, the position of the contact surface 12 of the wood component 10 with the to-be-fastened component 20 shown in FIG. 1 may be a position of the surface on which the wood key makes contact with the spacer.

A counterweight is sometimes affixed to the wood key of the keyboard device as a mass body for achieving balance with an action part such as a hammer. When the counterweight is affixed to the wood key, it is possible to accommodate the counterweight in a recess formed in the wood key and fasten the counterweight to the wood key using a screw. The fastening structure of each embodiment described above can be employed as the fastening structure between the wood key and the counterweight.

Although the present invention has been described above based on the preferred embodiments, the present invention is not limited to the above-described embodiments, and various modifications can be made without departing from the scope of the present invention.

Although a musical instrument has mainly been described in the above embodiments, the present invention is not limited thereto. The above-described fastening structure is suitable, for example, to applications in which another component is fastened to a long wood component, and a fastening state that is not easily loosened is required. Examples of other applications include, for example, crafts, gadgets and the like.

Moreover, the screw used in the embodiments described above is not limited to a general single-thread screw, with a double-thread screw also usable. In a single-thread screw, the distance the screw advances in one turn (lead) is equal to the pitch, and so the screw moves one pitch in one rotation. In a double thread screw, there are helices of two threads in one pitch, and so the lead is twice as large as a single-thread screw.

According to the embodiments of the present invention described above, even if the wood component expands or contracts, it is possible to suppress loosening of the fastening state between the to-be-fastened component and the wood component.

What is claimed is:

1. A keyboard device having a fastening structure, comprising:
   a wood key of the keyboard device;
   a to-be-fastened component; and
   a screw for fastening the to-be-fastened component to the wood key, wherein
   the wood key is made of wood having a specific gravity of 0.08 g/cm$^3$ to 0.85 g/cm$^3$ inclusive;
   the screw has a nominal diameter of 0.8 mm to 3.5 mm inclusive; and the distance between an intermediate position in a longitudinal direction of an effective screw portion, which is the portion where the wood key and a male screw portion formed on a shaft portion of the screw mesh together, and a contact surface of the wood key with the to-be-fastened component is 1 mm to 15 mm inclusive.

2. The keyboard device according to claim 1, wherein the to-be-fastened component is a backcheck component.

3. The fastening structure according to claim 1, wherein the area of the contact surface is 100 mm² or less per screw.

4. The fastening structure according to claim 1, wherein a plurality of projections are provided on at least one surface of the wood key and the to-be-fastened component that are facing each other.

5. The fastening structure according to claim 1, wherein a distance between a to-be-pressed surface where the to-be-fastened component is pressed from the head portion of the screw and the contact surface is 2 mm or less.

6. The fastening structure according to claim 1, wherein the effective screw portion is entangled with a dark ring of the wood key.

\* \* \* \* \*